United States Patent Office 2,713,039
Patented July 12, 1955

2,713,039

MODIFIED ALKYD RESINS AND PROCESS OF PREPARING SAME

Leonard E. Cadwell, Stamford, and John C. Petropoulos, South Norwalk, Conn., assignors to American Cyanamid Company, New York, N. Y., a corporation of Maine No Drawing. Continuation of applications Serial No. 34,565 and Serial No. 34,567, June 22, 1948. This application June 12, 1953, Serial No. 361,408

13 Claims. (Cl. 260—22)

The invention in this case relates to modified alkyd resins and to the process of preparing the same. More particularly, this invention relates to the process of reacting certain styrene compounds with an oil-modified alkyd resin in a mutually inert solvent having a boiling point of at least 110° C. and a Kauri-butanol value between 24–50.

One of the objects of the present invention is to produce a modified alkyd resin, which has particular application in the field of surface coating. A further object of the present invention is to produce a styrenated alkyd resin in the presence of a mutually inert mineral spirits solvent having a boiling point of at least 110° C. and a Kauri-butanol value between 24–50. A further object of the present invention is to produce coating compositions, which are homogeneous in the liquid state, and which are homogeneous in a cured film, and which further have markedly improved properties with the respect to drying time, hardness, gloss, alkali resistance and alcohol resistance. These and other objects of the present invention will be discussed more fully hereinbelow.

There are a plurality of critical features to the present invention. It has been indicated hereinabove that the solvent medium which is used is critical. In addition to the solvent medium criticality, it is also imperative that the catalysts used be selected from the group consisting of tertiary alkyl substituted hydroperoxides, ditertiary alkyl substituted peroxides and cumene hydroperoxide. A third and additional critical feature is the temperature at which the styrenation of the alkyd resin is accomplished.

We have found that the catalyst, besides accelerating co-reaction and effecting almost complete reaction of styrene and unsaturated oil in a much reduced time, exerts an important and hiterto unrecognized influence on the properties of the resulting interpolymer. By means of certain catalysts, it is possible to prepare styrene unsaturated ester interpolymers in which 90–100% of the styrene is completely combined. These interpolymer solutions are completely clear and homogeneous, show excellent stability characteristics, and have wider compatibilities with other film-forming materials than similar interpolymers made by previous methods. An additional novel feature of the interpolymers described herein, is their unusually good solubility in aliphatic hydrocarbon solvents, which are preferred solvents in the coating industry because of their low cost and negligible odor. In this regard, it is also desirable that such resin solutions tolerate at least 50 cc. and, preferably, 100 cc. of mineral spirits per 10 grams of resin solution, to insure that no precipitation of resin will occur during subsequent thinning operations, or in cleaning of spray equipment or brushes. All of the products produced according to the teachings of this invention, tolerate at least 50 cc. and, in most cases, more than 100 cc. Varsol #2 type mineral spirits per 10 grams resin solution. The tolerance for Varsol #1 type mineral spirits is slightly less but in most instances is well above the desired minimum value specified above. (Characteristics of the various solvents are given in more detail in Table 1.)

We have found, as described more fully hereinbelow, that new and useful products are obtained by the process which we have discovered, in reacting a monomeric styrene and an unsaturated oil-modified alkyd resin in the presence of a mutually inert solvent at a temperature between about 150–215° C. in the presence of a catalyst which decomposes with the liberation of free radicals between 100–215° C. These catalysts are the tertiary alkyl hydroperoxides, the ditertiary alkyl peroxides, and the cumene hydroperoxide. Representative members of the tertiary alkyl peroxides are such catalysts as 2,2-bis(tertiary butyl peroxy)-butane, di-tertiary butyl peroxide, tertiary butyl peroxide, cumene hydroperoxide and the like. By practicing the process of the present invention, it is possible to co-react from 5% to 95% of a styrene compound, and preferably, 10% to 50% of a styrene compound, based on the final interpolymeric reaction product, depending for optimum results upon the percentage of phthalic content of the alkyd, as well as the type of oil employed in modifying the alkyd.

We have found that to effect the reaction to give most satisfactory results and the preferred useful products, the co-reaction must be effected at a temperature above 150° C. and below the temperature at which depolymerization of polystyrene occurs at a significant rate (290° C.–300° C.), the preferred temperature range being between 160–175° C. It is further preferred that the reaction temperature does not exceed 215° C. significantly.

As previously stated generally, in order to obtain the preferred products having the desired utility and in a minimum of processing time, a catalyst of the class described is employed in an amount varying from about 0.5% to about 5% based on the weight of coreaction materials. From an optimum viewpoint, it is preferred to use from about 1% to about 2% of catalyst described, among which there may be mentioned 2,2-bis(tertiary butyl peroxy)butane, tertiary butyl hydroperoxide, di-tertiary butyl peroxide, tertiary butyl propyl peroxide, tertiary butyl penta-methylethyl peroxide and cumene hydroperoxide. The preferred catalyst is 2,2-bis(tertiary butyl peroxy)butane, which, in addition to accelerating the processing time, provides a final product having a higher degree of mineral spirits tolerance, as well as a preferred clarity of solution and film produced therefrom.

An inert solvent which is mutually solvent to the monomeric material as well as to the oil-modified alkyd resin, is satisfactory for practicing the process of the present invention. These solvents should have a boiling point above 110° C. (230° F.), and an average Kauri-butanol value between 24–50. As examples of solvents of this class which have been found to be satisfactory, there are kerosene, Ultracene, Varsol #1, Varsol #2 and the like. It is preferred to employ those solvents having a Kauri-butanol value between about 35–45, due to economical considerations and odor of product. It should be noted that the solvents in this range have utility, according to the process of the present invention, whereas in prior art practices, aromatic solvents or aliphatic solvents in conjunction with terpenes, must be used. The characteristics of the solvents mentioned hereinabove are set forth in great detail in the following table:

TABLE I

*Characteristics of hydrocarbon solvents*

| Solvent | Manufacturer | Specific Gravity | Distillation Range, °F. | | | Final Boiling Pt. | Kauri-Butanol Value Toluent =100 | Aniline Pt., °F. |
| --- | --- | --- | --- | --- | --- | --- | --- | --- |
| | | | In. Boiling Pt. | Temperature at 50% | Temperature at 90% | | | |
| Varsol No. 2 | Standard Oil of New Jersey | .802 | 310 | 341 | 367 | 403 | 43 | 110 |
| Varsol No. 1 | do | .788 | 305 | 342 | 367 | 392 | 36 | 132 |
| Kerosene | do | | 338 | 429 | 496 | 532 | 32 | 152 |
| Ultracene | Atlantic Refining Co | | 390 | | | 490 | 27 | |

These solvents may be used individually or in combination with one another in amounts sufficient to provide solutions containing between about 20% to 90% solids and preferably between 40% and 80% solids.

The unsaturated oil-modified alkyd resins which may be employed in practicing this invention are the conventional type of alkyd resin made by co-reacting a polybasic acid, an unsaturated vegetable oil introduced partly or wholly in the form of fatty acid or monoglyceride, and a polyhydric alcohol at an elevated temperature until esterification is substantially complete. At least 90% by weight of the polybasic acid component should consist of a saturated acid, i. e., a polycarboxylic acid free of non-benzenoid unsaturation, preferably phthalic, although others may be employed, and the remainder of the polybasic acid may or may not be unsaturated. The polyhydric alcohol component may be any one of the available polyhydric alcohols or mixtures thereof, such as ethylene glycol, diethylene glycol, propylene glycol, polyglycols, such as hexaethylene glycol, glycerine, trimethylol propane, trimethylol ethane, pentaerythritol, polyallyl alcohol, etc.

The major oil constituent of the alkyd resin is an unsaturated vegetable oil selected from the class of drying and semi-drying oils. Among the various oils which may be used singly or in combination as modifiers for the alkyd resin may be mentioned the following: China-wood oil, dehydrated castor oil, castor oil, linseed oil, perilla oil, soya oil, corn oil, cotton seed oil, tall oil, distilled tall oil fatty acids, etc. These may be used singly or in combination with one another or in combination with relatively saturated oils such as coconut, etc.

The proportion of the styrene compound which can be co-reacted with the alkyd resin is dependent on the degree of unsaturation in the oil, as well as the type of unsaturation, that is, whether conjugated or non-conjugated. A further important factor is the oil content of the alkyd resin itself.

From a practical viewpoint, the least unsaturated oils which may be employed are: corn, cottonseed and soya oils. China-wood oil and dehydrated castor oil may be used to modify alkyd resins which combine readily with styrene to yield homogeneous, stable, fast-drying interpolymers. Linseed and perilla oils occupy an intermediate position between the above groups, with respect to reactivity with the styrene compounds.

The following table illustrates the relationship between the percent of phthalic anhydride in the alkyd, and the amount of styrene that is preferably co-reacted with the various types of oil-modified alkyd resins. It is shown in this following table that the preferred quantity of styrene, wherein the percent is based on the total weight of styrene and oil-modified alkyd resin, varies with each particular oil.

TABLE II

*Range of styrene content*

| Percent Phthalic Anhydride In Alkyd | Soya, Percent | Linseed, Percent | Dehydrated Castor Oil, Percent | Linseed-Dehydrated Castor Oil 50/50, Percent | Soya-Dehydrated Castor Oil 50/50, Percent | China-wood Oil |
| --- | --- | --- | --- | --- | --- | --- |
| 40–44% (Short oil alkyds) | 10–15 | 20–25 | 1 10–80 | 60 | 25–35 | Seldom used as sole modifier. Where used in combination with other oils, the behavior is similar to dehydrated castor or conjugated linseed oil. |
| 32–36% (Medium oil alkyds) | 30–35 | 35 | 1 10–80 | 55 | 45 | |
| 20–26% (Long oil alkyds) | 20 | 35 | 60 | 55 | 35 | |

1 Concentration of solvent during reaction must be varied to suit conditions

The above table is only illustrative of some of the preferred conditions with respect to proportions of materials, and is not to be construed to be a limitation. It has further been found, for example, that wherein mixtures of oils are used as the modifier, the preferred range or percent of styrene content will vary almost as a mean average of the properties of the individual oil modifiers.

In order that the present invention may be more completely understood, the following examples are set forth, in which all parts are parts by weight. These examples are set forth primarily for the purpose of illustration and any specific enumeration of detail contained therein should not be interpreted as a limitation on the case except as indicated in the appended claims.

*Example 1.—Oil-modified alkyd resin A*

| | Parts |
| --- | --- |
| Phthalic anhydride | 148 |
| Refined soya oil acids | 73 |
| Refined soya oil | 38 |
| Refined castor oil | 120 |
| Glycerine, 95% | 96 |

All of the materials were heated to 280° C. for approximately 2 hours, using nitrogen to remove water formed; and, then for approximately 4 hours at 245° C. The finished resin is dissolved in mineral spirits to give a 50% solution having the following characteristics: acid number—8.5, viscosity—X to Y (Gardner-Holdt), color—3 (Gardner).

Example 2.—Interpolymer resin solution

Oil-modified alkyd resin A___ 75 parts (solids weight).
Styrene (monomeric)_____ 25 parts.
Varsol #1_____ 100 parts.
2,2-bis(tertiary butyl peroxy)-
  butane _____ 2 parts.

All of these ingredients were charged and heated at 158° C.–161° C. for 6½ hours. At the end of this time the viscosity of the resulting interpolymer solution was X to Y, the percent solids was 49.2, and the mineral spirits (Varsol #1) tolerance of 10 grams of resin solution was greater than 100 cc.

Example 3.—Interpolymer resin solution

|  | Parts |
|---|---|
| Oil-modified alkyd resin A | 55 |
| Styrene | 45 |
| Varsol #2 | 100 |
| 2,2-bis(tertiary butyl peroxy)butane | 2 |

The procedure was the same as in Example 2 above. The final viscosity was V, percent solids was 49.3, mineral spirits tolerance was 31 cc. Varsol #1 and more than 100 cc. Varsol #2, respectively, for 10 grams resin solution.

Example 4.—Oil-modified alkyd resin B

|  | Parts |
|---|---|
| Phthalic anhydride | 148 |
| Refined castor oil | 300 |
| Glycerine, 95% | 86.5 |

The procedure for preparing this resin was the same as described previously in Example 1, all materials being heated at 280° C. for 1½ hours, and then at 220° C. for 5 hours. A 60% solids solution of the final resin in mineral spirits had the following characteristics: acid no. of 6.3, viscosity Z— and color 6–7.

Example 5.—Interpolymer resin solution

Oil-modified alkyd resin B___ 75 parts (solids weight).
Styrene _____ 25 parts.
Varsol #1_____ 100 parts.
2,2-bis(tertiary butyl peroxy)-
  butane _____ 2 parts.

The procedure of Example 2 was followed to yield a solution having the following characteristics: viscosity—Z—2, color—3 to 4, solids content—49.7, mineral spirits tolerance—50 cc. Varsol #1 and more than 100 cc. Varsol #2 per 10 grams resin solution.

Example 6.—Interpolymer resin solution

Oil-modified alkyd resin B___ 45 parts (solids weight).
Styrene _____ 55 parts.
Varsol #2_____ 100 parts.
2,2-bis(tertiary butyl peroxy)-
  butane _____ 2 parts.

The procedure of Example 2 was followed. The final viscosity was X+, solids content—49.7%, mineral spirits tolerance—9.2 cc. Varsol #1 and 74 cc. Varsol #2, respectively, per 10 grams resin solution.

Example 7.—Oil-modified alkyd resin C

|  | Parts |
|---|---|
| Phthalic anhydride | 148 |
| Refined soya monoglyceride | 185 |
| Refined soya oil | 77 |
| Glycerine, 95% | 38 |

The materials were heated to 250° C. under nitrogen atmosphere for approximately 8 hours. The finished resin was dissolved in Varsol #1 to give a 60% solids solution. Final characteristics of the resin were: acid no.—10.6, viscosity—X to Y, and color—6 to 7.

Example 8.—Interpolymer resin solution

Oil-modified alkyd resin C____ 75 parts (solids weight).
Styrene _____ 25 parts.
Varsol #1 _____ 67 parts.
2,2-bis(tertiary butyl peroxy)-
  butane _____ 2 parts The alkyd was dissolved in the Varsol #1, and the solution heated to reflux; then the catalyst was dissolved in the monomeric styrene, and slowly added to the resin solution over a one hour period at reflux. The materials were refluxed for about 6 hours, at the end of which time the viscosity was Y—Z, solids was 58.0%, Varsol #1 tolerance was greater than 100 cc. per 10 grams sample of resin solution.

Example 9.—Interpolymer resin solution

Oil-modified alkyd resin C____ 65 parts (solids weight).
Styrene _____ 35 parts
Varsol #2 _____ 43 parts.
2,2-bis(tertiary butyl peroxy)-
  butane _____ 2 parts.
Varsol #2 _____ 24 parts.

The alkyd was dissolved in 43 parts of Varsol, and heated to reflux. A mixture of the styrene, catalyst and 24 parts of Varsol was slowly added to the resin solution over a one hour period at reflux, and the resulting solution refluxed for 6 hours, at the end of which time the viscosity was Z—, Varsol #1 tolerance was greater than 100 cc. per 10 grams resin solution, and the solids was 58.4%.

Example 10.—Oil-modified alkyd resin D

|  | Parts |
|---|---|
| Phthalic anhydride | 148 |
| Refined soya oil monoglyceride | 192 |
| Refined soya oil | 36 |
| Glycerine, 95% | 42 |

All of the ingredients were heated together at 245° C., under an inert atmosphere for 9 hours. The finished resin was dissolved in Varsol #1 to give a 50% solution having the following characteristics: acid no.—8.9, viscosity—Z, and color—6.

Example 11.—Interpolymer resin solution

Oil-modified alkyd resin D (50%
  soln. in Varsol #1)_____ 160 parts (80 parts resin solids).
Styrene_____ 20 parts.
Varsol #1_____ 20 parts.
2,2 - bis(tertiary butyl peroxy)butane_____ 2 parts.

The procedure was the same as in Example 8. Final viscosity was $Z_1$, solids content was 49.2, Varsol #1 tolerance was greater than 100 cc. per 10 grams resin solution.

Example 12.—Oil-modified alkyd resin E

|  | Parts |
|---|---|
| Phthalic anhydride | 148 |
| Refined soya oil | 350 |
| Pentaerythritol | 78 |
| Calcium hydroxide | .35 |

The soya oil, pentaerythritol and calcium hydroxide were heated to 235° C. and held at that temperature until the product was soluble in ethanol. The phthalic anhydride was then added and the product heated at 245° C. until the acid number was 6 to 8, and diluted with Varsol #1 to give a 65% solids solution having a viscosity of T to U.

*Example 13.—Interpolymer resin solution*

| | |
|---|---|
| Oil-modified alkyd resin E (65% solution) | 115 parts (75 parts resin solids). |
| Styrene | 25 parts. |
| Varsol #1 | 27 parts. |
| 2,2 - bis(tertiary butyl peroxy)butane | 2 parts. |

The procedure was the same as Example 8, with the exception that the addition of styrene was made in 2 hours, instead of 1 hour. Final resin solution had a viscosity of Y—, percent solids—58.2, and an infinite mineral spirits tolerance.

*Example 14.—Interpolymer resin solution*

| | |
|---|---|
| Oil-modified alkyd resin A | 75 parts (solids weight). |
| Styrene (monomeric) | 25 parts. |
| Varsol #1 | 100 parts. |
| 2,2-bis(tertiary butyl peroxy)butane | 2 parts. |

The composition was the same as Example 2, with an additional change in procedure. The alkyd was dissolved in the Varsol and the monomeric styrene and catalyst were added in a one hour period at reflux. The final characteristics of the solution were: viscosity—$Z_1$, mineral spirits tolerance was more than 100 cc. per 10 grams resin solution, and percent solids—49.2.

*Example 15.—Interpolymer resin solution*

Example 14 was repeated using other catalysts in place of 2,2-bis(tertiary butyl peroxy)butane. The amount of catalyst employed is given as percent by weight of styrene and alkyd. The procedure was the same as Example 14 except that in the case of Resin No. 4, the polymerizable solids content (alkyd and styrene) was 55% instead of 50%. The characteristics of the resin are given in the table below:

TABLE III

| Resin No. | Catalyst | Viscosity | Tolerance, cc./10 gms. soln. | | Percent Solids |
|---|---|---|---|---|---|
| | | | Varsol #1 | Varsol #2 | |
| 1 | 2% Tertiary butyl hydroperoxide. | $Z_4$–$Z_5$ | 20 | 100 | 49 |
| 2 | 1% Ditertiary butyl peroxide. | $Z_2$+ | 60 | 100 | 48.6 |
| 3 | 1% 2,2-Bis(tertiary butyl peroxy)butane. | $Z_2$– | 54 | 100 | 48.3 |
| 4 | 3– Cumene hydroperoxide. | $Z_3$–$Z_4$ | 33 | 100 | 52.3 |

*Example 16.—Oil-modified alkyd resin F*

| | Parts |
|---|---|
| Phthalic anhydride | 148 |
| Dehydrated castor oil fatty acid | 220 |
| Glycerol (95%) | 101 |

All of the materials were heated to 225° C. under an atmosphere of nitrogen and held for 7 hours. The resin was dissolved in Varsol #1 to give a 50% solution. The characteristics of the final resin were: acid number—9.0, viscosity—O and color—3 to 4.

*Example 17.—Interpolymer resin solution*

| | |
|---|---|
| Oil-modified alkyd resin F | 65 parts (solids weight). |
| Styrene | 35 parts. |
| Varsol #1 | 100 parts. |
| 2,2-bis(tertiary butyl peroxy)butane | 2 parts. |

The alkyd was dissolved in the Varsol and the monomeric styrene and catalyst were added to the alkyd solution at reflux over a one hour period. The resulting solution was refluxed for 6 hours. The characteristics of the finished resin solution were: viscosity—Z+, percent solids—48.5, Varsol #1 tolerance 37 cc. and Varsol #2 tolerance greater than 100 cc. per 10 grams of resin solution.

The polycarboxylic acids used to prepare these alkyd resins should be comprised of at least 90% by weight of such acids as malonic, succinic, glutaric, sebacic, adipic, pimelic, suberic, malic, azelaic, phthalic, and the like. Of these, phthalic acid is preferred. Whenever available anhydrides of these acids or mixtures of these acids and/or their anhydrides may be used.

In place of the monomeric styrene per se one may use the ring-substituted styrenes such as the ring-substituted alkyl styrenes; namely, the mono- and di-alkyl styrenes such as methyl styrene, dimethyl styrene, methyl-ethyl styrene, di-ethyl styrenes. Furthermore, one may use chloro styrenes such as the mono and dichloro styrenes and chloro alkyl styrenes such as the methyl-chloro styrenes and ethyl chloro styrenes, and the like. The following examples are illustrative of these concepts.

*Example 18.—Oil-modified alkyd resin G*

| | Parts |
|---|---|
| Phthalic anhydride | 148 |
| Refined soya oil acids | 73 |
| Refined soya oil | 38 |
| Refined castor oil | 120 |
| Glycerine, 95% | 96 |

All materials were heated to 280° C. for approximately 2 hours, using nitrogen to remove water formed; and, then for approximately 4 hours at 245 C. The finished resin is dissolved in mineral spirits to give a 50% solution having the following characteristics: acid number—8.5, viscosity—X to Y (Gardner-Holdt), color—3 (Gardner).

*Example 19.—Interpolymer resin solution*

| | Parts by weight |
|---|---|
| Oil-modified alkyd resin G | 75 |
| Monochlorostyrene | 25 |
| Varsol #1 | 100 |
| 2,2 - bis(tertiary butyl peroxy)butane | 2 |
| Xylol | 10 |

All materials except the xylol were charged in a three-neck flask and heated to reflux. The solution was refluxed at 152° C. to 159° C. for 6 hours and the xylol was added. The resulting clear resin solution had the following characteristics: viscosity—X+, percent solids—46.2, Varsol #1 tolerance 34 cc. and Varsol #2 tolerance greater than 100 cc. per 19 grams resin solution.

Comparable products can be obtained when the xylol is added with the initial charge; also, Varsol #2 may be substituted for the Varsol #1, and then no xylol need be used to obtain comparable products, due to the higher Kauri-butanol value.

*Example 20.—Interpolymer resin solution*

| | Parts by weight |
|---|---|
| Oil-modified alkyd resin G | 75 |
| 2,4 - dimethyl styrene | 25 |
| Varsol #1 | 100 |
| 2,2 - bis(tertiary butyl peroxy)butane | 2 |

All materials were heated at reflux (158° C.–165° C.) for 6 hours. The resulting clear resin solution had the following characteristics: viscosity—W, percent solids—48.9, Varsol #1 and Varsol #2 tolerance—greater than 100 cc. per 10 grams resin solution.

*Example 21.—Interpolymer resin solution*

| | Parts by weight |
|---|---|
| Oil-modified alkyd resin G | 75 |
| Dichlorostyrene | 25 |
| Varsol #1 | 100 |
| 2,2 - bis(tertiary butyl peroxy)butane | 2 |
| Xylol | 14 |

The procedure was the same as in Example 19. The characteristics of the resulting resin solution were as follows: viscosity—W+, percent solids—46.2, Varsol #1 tolerance 34 cc. and Varsol #2 tolerance—greater than 100 cc. per 10 grams resin solution.

All of the interpolymer resin solutions were clear solutions, which when applied to surfaces such as wood, sheet metal, cloth laminates and the like, by brushing or spraying, deposited clear films when permitted to air dry. The clear films obtained from these compositions exhibited excellent clarity, gloss and resistance to acid alkali, organic solvents and abrasion.

This application is a continuation of our co-pending applications having the Serial No. 34,565, filed June 22, 1948, now abandoned, and 34,567, filed June 22, 1948 now abandoned.

We claim:

1. A process which comprises co-reacting, at a temperature between 160–175° C., a member selected from the group consisting of styrene, ring-substituted alkyl-styrenes and ring-substituted chloro styrenes and an unsaturated oil-modified alkyd resin, in a mutually inert solvent having a boiling point above 110° C., and a Kauri-butanol value between 24–43, in the presence of a catalyst selected from the group consisting of tertiary alkyl substituted diperoxides, tertiary alkyl substituted hydroperoxides and cumene hydroperoxide, which liberates free radicals between 100–215° C., wherein the oil modifier of said oil-modified alkyd resin is selected from the group consisting of drying and semi-drying oils; wherein the polycarboxylic acid used to prepare said alkyd resin consists of at least 90% by weight of a polycarboxylic acid free from non-benzenoid unsaturation and wherein the peroxide group of the catalyst is directly attached to the tertiary group.

2. A process which comprises co-reacting, at a temperature between 160–175° C., styrene and an unsaturated oil-modified alkyd resin, in a mutually inert solvent having a boiling point above 110° C. and a Kauri-butanol value between 24–43, in the presence of a catlyst selected from the group consisting of tertiary alkyl substituted diperoxides, tertiary alkyl substituted hydroperoxides and cumene hydroperoxide, which liberates free radicals between 100–215° C., wherein the oil modifier of said oil-modified alkyd resin is selected from the group consisting of drying and semi-drying oils; wherein the polycarboxylic acid used to prepare said alkyd resin consists of at least 90% by weight of a polycarboxylic acid free from non-benzenoid unsaturation and wherein the peroxide group of the catalyst is directly attached to the tertiary group.

3. A process which comprises co-reacting, at a temperature between 160–175° C., styrene and a soya oil-modified alkyd resin in a mutually inert solvent, having a boiling point above 110° C. and a Kauri-butanol value between 24–43, and in the presence of a catalyst selected from the group consisting of tertiary alkyl substituted diperoxides, tertiary alkyl substituted hydroperoxides, and cumene hydroperoxide, which liberates free radicals between 100–215° C., wherein the polycarboxylic acid used to prepare said alkyd resin consists of at least 90% by weight of a polycarboxylic acid free from non-benzenoid unsaturation and wherein the peroxide group of the catalyst is directly attached to the tertiary group.

4. A process which comprises co-reacting, at a temperature between 160–175° C., styrene and an unsaturated oil-modified alkyd resin in the presence of a mutually inert solvent having a boiling point above 110° C. and a Kauri-butanol value between 24–43, in the presence of a tertiary butyl substituted diperoxide catalyst, wherein the oil modifier of said oil-modified alkyd resin is selected from the group consisting of drying and semi-drying oils; wherein the polycarboxylic acid used to prepare said alkyd resin consists of at least 90% by weight of a polycarboxylic acid free from nonbenzenoid unsaturation and wherein the peroxide group of the catalyst is directly attached to the tertiary group.

5. A process which comprises co-reacting, at a temperature between 160–175° C., styrene and an unsaturated oil-modified alkyd resin, in a mutually inert solvent, having a boiling point of above 110° C. and a Kauri-butanol value between 24–43, in the presence of ditertiary butyl peroxide, wherein the oil modifier of said oil-modified alkyd resin is selected from the group consisting of drying and semi-drying oils; wherein the polycarboxylic acid used to prepare said alkyd resin consists of at least 90% by weight of phthalic acid.

6. A process which comprises co-reacting, at a temperature between 160–175° C., styrene and an unsaturated oil-modified alkyd resin, in a mutually inert solvent, having a boiling point of above 110° C. and a Kauri-butanol value between 24–43, in the presence of ditertiary butyl peroxide, in an amount varying between 0.5–5.0% by weight based on the total weight of styrene and the oil modified alkyd resin, wherein the oil modifier of said oil-modified alkyd resin is selected from the group consisting of drying and semi-drying oils; wherein the polycarboxylic acid used to prepare said alkyd resin consists of at least 90% by weight of phthalic anhydride.

7. A process which comprises co-reacting, at a temperature between 160–175° C., styrene and an unsaturated oil-modified alkyd resin, in a mutually inert solvent having a boiling point above 110° C. and a Kauri-butanol value between 24–43, in the presence of 2,2-bis(tertiary butyl peroxy)butane, wherein the oil modifier of said oil-modified alkyd resin is selected from the group consisting of drying and semi-drying oils; wherein the polycarboxylic acid used to prepare said alkyd resin consists of at least 90% by weight of a polycarboxylic acid free from non-benzenoid unsaturation.

8. A process which comprises co-reacting, at a temperature between 160–175° C., styrene and an unsaturated oil-modified alkyd resin, in a mutually inert solvent having a boiling point above 110° C. and a Kauri-butanol value between 24–43, in the presence of 2,2-bis(tertiary butyl peroxy)butane, present in an amount varying between 0.5–5.0% based on the total weight of styrene and oil-modified alkyd resin, wherein the oil modifier of said oil-modified alkyd resin is selected from the group consisting of drying and semi-drying oils; wherein the polycarboxylic acid used to prepare said alkyd resin consists of at least 90% by weight of a polycarboxylic acid free from non-benzenoid unsaturation.

9. A process which comprises co-reacting, at a temperature between 160–175° C., styrene and an unsaturated oil-modified alkyd resin, wherein said styrene constitutes 5–95% of the total weight of styrene and unsaturated oil-modified alkyd resin, said coreacting being effected in the presence of 2,2-bis(tertiary butyl peroxy)butane and in the presence of a mutually inert solvent having a boiling point above 110° C. and a Kauri-butanol value between 24–43, and said solvent being present in an amount sufficient to provide a 20–90% solution of the polymerizable materials, wherein the oil modifier of said oil-modified alkyd resin is selected from the group consisting of drying and semi-drying oils; wherein the polycarboxylic acid used to prepare said alkyd resin consists of at least 90% by weight of a polycarboxylic acid free from non-benzenoid unsaturation.

10. A process which comprises co-polymerizing styrene and an unsaturated oil-modified alkyd resin, wherein said styrene constitutes 10–50% of the total weight of the styrene and the unsaturated oil-modified alkyd resin, said polymerizing being effected in a mutually inert solvent having a boiling point above 110° C. and a Kauri-butanol value between 24–43, and said solvent being present in an amount sufficient to provide a 20–90% solution of said polymerizable materials, and said co-polymerization being effected at a temperature between 160–175° C. in the presence of 2,2-bis(tertiary butyl peroxy)butane, wherein the oil modifier of said oil-modified alkyd resin is selected from the group consisting of drying and semi-drying oils; wherein the polycarboxylic acid used to prepare said alkyd resin consists of at least 90% by weight of phthalic anhydride.

11. A process which comprises co-reacting at a temperature between 160–175° C., a ring-substituted dichlorostyrene and an unsaturated oil-modified alkyd resin, in a mutually inert solvent having a boiling point above 110° C. and a Kauri-butanol value between 24–43, in the presence of a tertiary alkyl substituted hydroperoxide catalyst present in an amount from 0.5–5.0% by weight based on the weight of the styrene and oil-modified alkyd resin, wherein the oil modifier of said oil-modified alkyd resin is selected from the group consisting of drying and semi-drying oils; wherein the peroxide group of the catalyst is directly attached to the tertiary alkyl group and wherein the polycarboxylic acid used to prepare said alkyd resin consists of at least 90% by weight of a polycarboxylic acid free from non-benzenoid unsaturation.

12. A process which comprises co-reacting a ring-substituted chlorostyrene and an unsaturated oil-modified alkyd resin, in a mutually inert solvent having a boiling point above 110° C. and a Kauri-butanol value between 24–43, in the presence of 2,2-bis-(tertiary butyl peroxy)-butane, wherein the oil modifier of said oil-modified alkyd resin is selected from the group consisting of drying and semi-drying oils; wherein the polycarboxylic acid used to prepare said alkyd resin consists of at least 90% by weight of a polycarboxylic acid free from non-benzenoid unsaturation; wherein said styrene constitutes 10–50% of the total weight of styrene and unsaturated oil-modified alkyd resin, wherein said solvent is present in an amount sufficient to provide a 20–90% solution of said polymerizable materials and wherein said co-reaction is effected at a temperature between 160–175° C.

13. A process which comprises co-reacting, at a temperature between 160–175° C., styrene and an unsaturated oil-modified alkyd resin in the presence of a mutually inert solvent having a boiling point above 110° C. and a Kauri-butanol value between 24–43 and in the presence of a tertiary alkyl substituted hydroperoxide catalyst present in an amount varying between about 0.5–5.0% by weight based on the weight of the styrene and the oil-modified alkyd resin, wherein the oil modifier of said oil-modified alkyd resin is selected from the group consisting of drying and semi-drying oils; wherein the polycarboxylic acid used to prepare said alkyd resin consists of at least 90% by weight of a polycarboxylic acid free from non-benzenoid unsaturation and wherein the peroxide group of the catalyst is directly attached to the tertiary alkyl group.

References Cited in the file of this patent

UNITED STATES PATENTS

| Number | Name | Date |
|---|---|---|
| 2,305,224 | Patterson | Dec. 15, 1942 |
| 2,392,710 | Wakeford et al. | Jan. 8, 1946 |
| 2,426,476 | Vaughan et al. | Aug. 26, 1947 |
| 2,444,655 | Kroeker et al. | July 6, 1948 |
| 2,468,770 | Morris et al. | May 3, 1949 |
| 2,495,458 | Kanning et al. | Jan. 24, 1950 |